United States Patent
Behner et al.

(10) Patent No.: US 9,003,623 B2
(45) Date of Patent: Apr. 14, 2015

(54) APPARATUS FOR FORMING A BLOWER WHEEL HAVING LONGITUDINALLY INCLINED BLADES

(75) Inventors: Kenneth Joseph Behner, Avon Lake, OH (US); Joseph H. Andulics, North Ridgeville, OH (US); Mark Stuart Resar, Wellington, OH (US); Stephen Joseph Amerla, Avon Lake, OH (US)

(73) Assignee: Beckett Air Incorporated, North Ridgeville, OH (US)

( * ) Notice: Subject to any disclaimer, the term of this patent is extended or adjusted under 35 U.S.C. 154(b) by 846 days.

(21) Appl. No.: 13/277,486

(22) Filed: Oct. 20, 2011

(65) Prior Publication Data

US 2013/0097831 A1 Apr. 25, 2013

(51) Int. Cl.
*B23Q 1/00* (2006.01)
*F04D 29/28* (2006.01)
*B23P 15/00* (2006.01)

(52) U.S. Cl.
CPC .............. *F04D 29/283* (2013.01); *B23P 15/006* (2013.01)

(58) Field of Classification Search
CPC .......... B23Q 1/00; B23Q 1/0063; B23Q 1/03; B23Q 1/70; B23Q 3/00
USPC .......................... 29/283.5, 281.1, 281.5, 281.2
See application file for complete search history.

(56) References Cited

U.S. PATENT DOCUMENTS

| | | | |
|---|---|---|---|
| 935,114 A | 9/1909 | Keith | |
| 4,418,458 A * | 12/1983 | Hunter | 29/237 |
| 6,220,818 B1 | 4/2001 | Andulics et al. | |
| 6,898,835 B1 | 5/2005 | Andulics et al. | |
| 7,594,420 B2 * | 9/2009 | Len | 72/316 |
| 8,092,181 B2 | 1/2012 | Nishino | |
| 2013/0097831 A1 * | 4/2013 | Behner et al. | 29/283.5 |
| 2014/0013561 A1 * | 1/2014 | Haas et al. | 29/283.5 |

OTHER PUBLICATIONS

U.S. Appl. No. 13/277,546, filed Oct. 20, 2011. 19 Pages.
Notice of Allowance dated Jan. 2, 2014 for U.S. Appl. No. 13/277,546. 20 Pages.

* cited by examiner

*Primary Examiner* — Lee D Wilson
(74) *Attorney, Agent, or Firm* — Eschweiler & Associates, LLC

(57) ABSTRACT

An apparatus for forming an inclined-blade blower wheel is provided. A plurality of blades are initially positioned between first and second end caps, and a first engagement member mates with the first end cap, while a second engagement member mates with the second end cap. First and second end motors are configured to independently rotate the first and second engagement members. A crimping roller coupled to a crimping motor contacts and compresses a circumference of the first and second end caps to a plurality of blades. A controller is configured to rotate the first engagement member a predetermined amount with respect to the second engagement member, a then circumferential speed of the first and second end caps and the crimping roller is synchronized, therein fixing a desired longitudinal pitch of the plurality of blades between the first and second end caps.

20 Claims, 6 Drawing Sheets

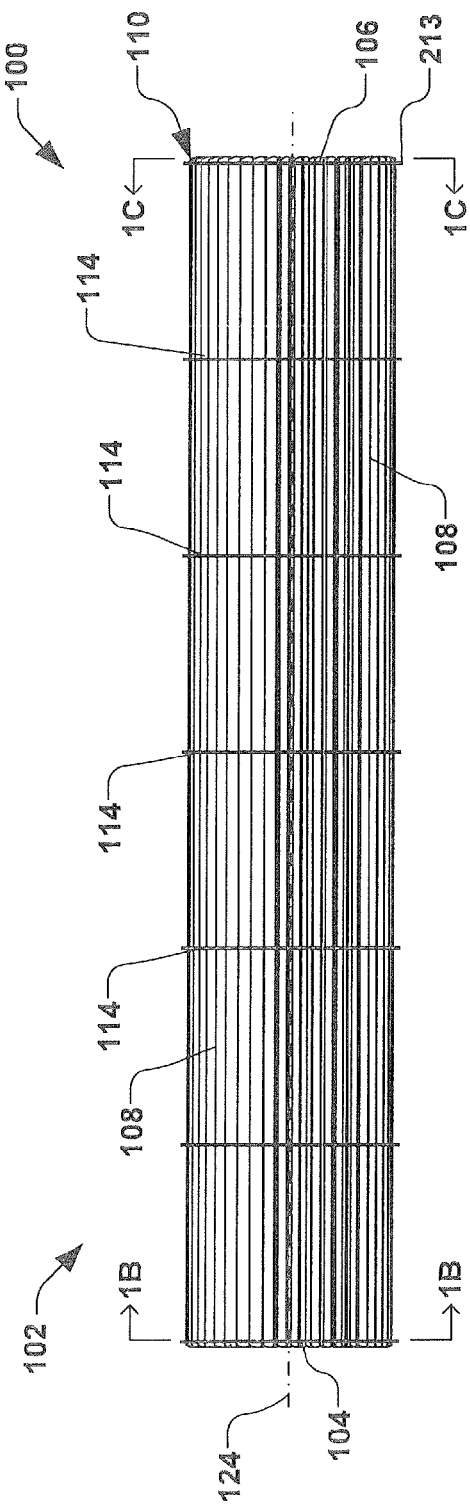
FIG. 1A
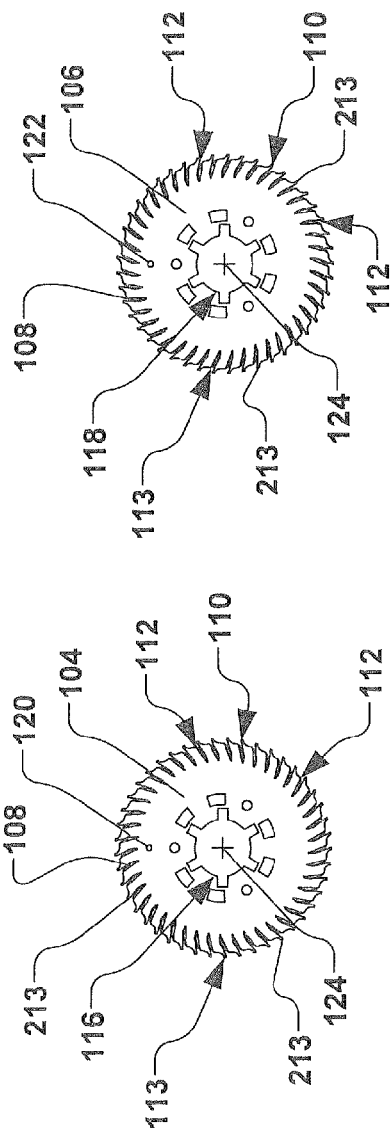
FIG. 1B
FIG. 1C

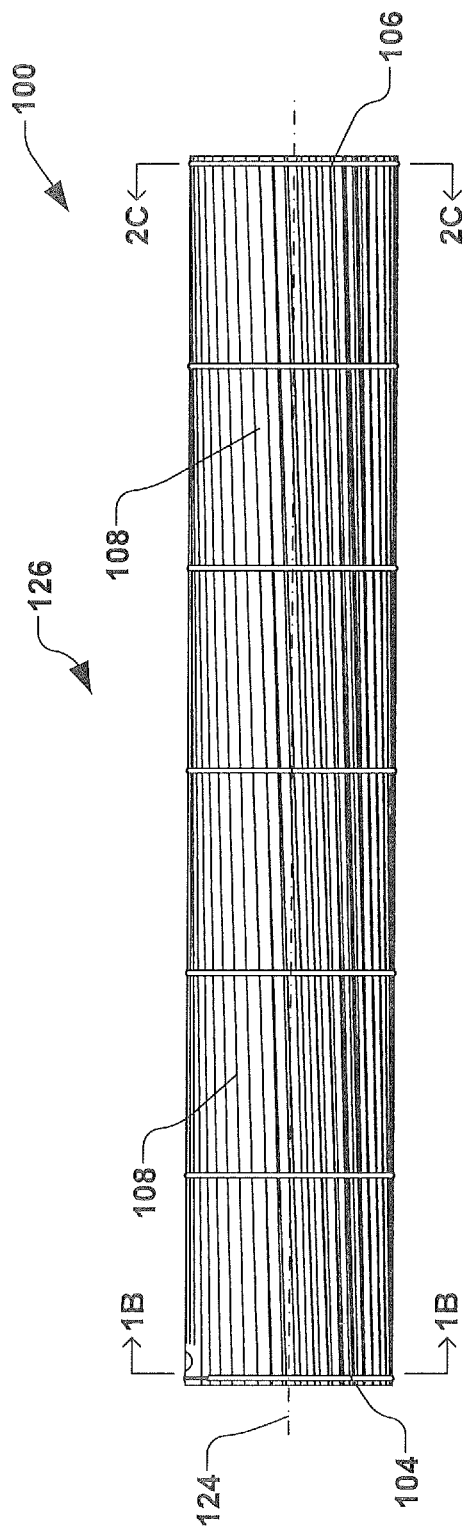
FIG. 2A
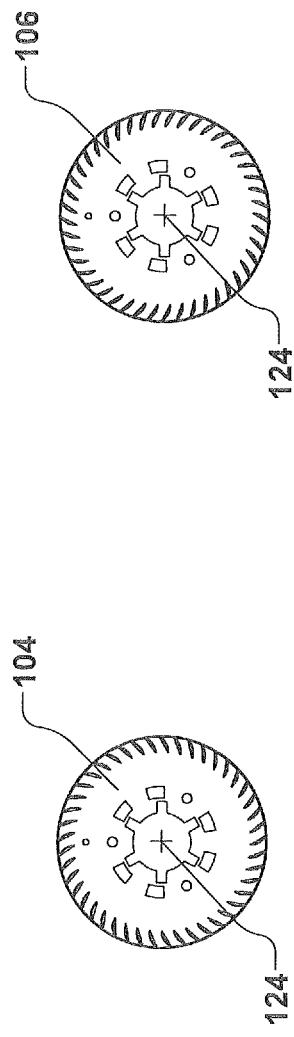
FIG. 2B
FIG. 2C

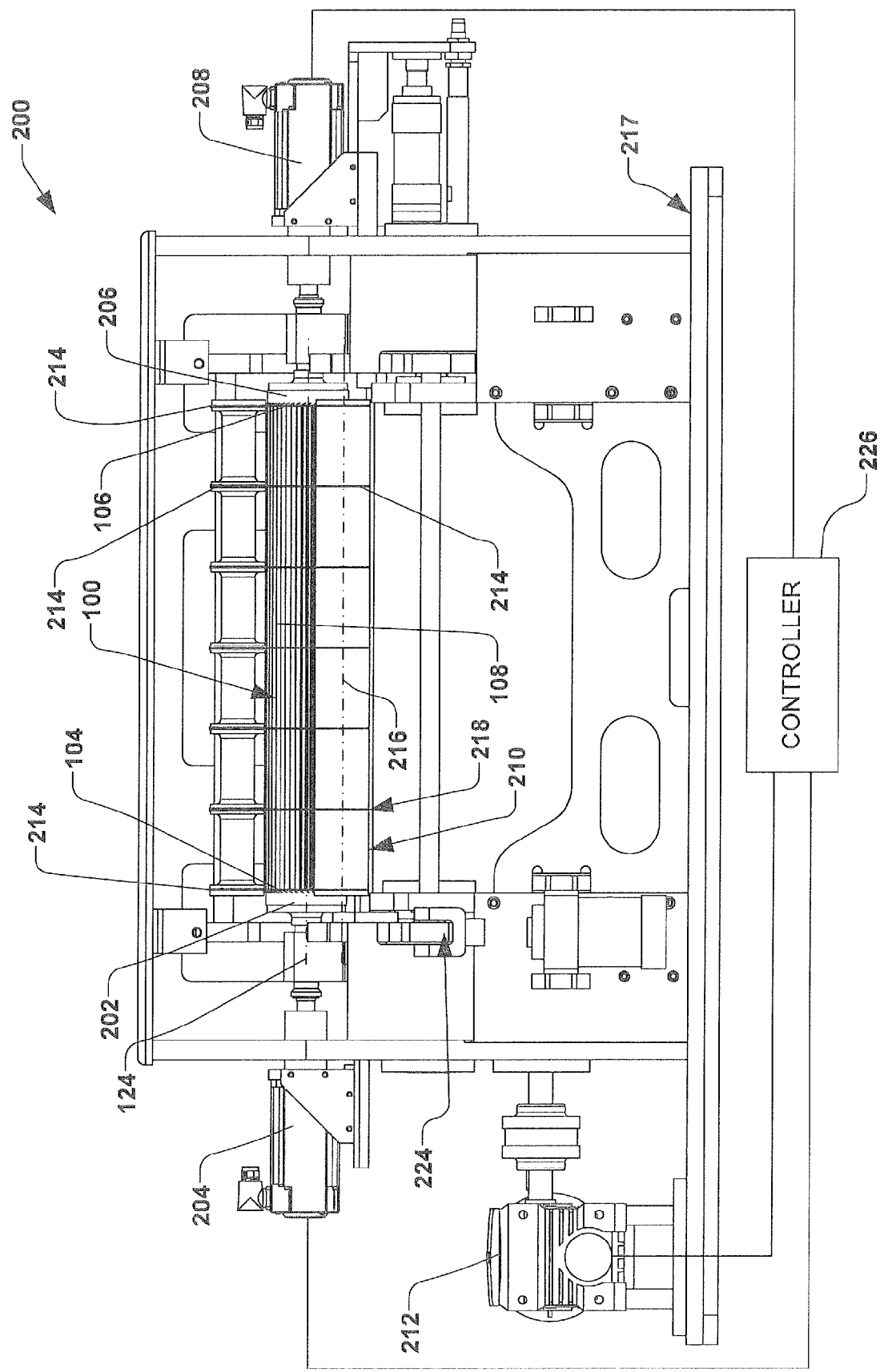

APPARATUS FOR FORMING A BLOWER WHEEL HAVING LONGITUDINALLY INCLINED BLADES

FIELD OF THE INVENTION

The present invention relates generally to a manufacturing apparatus and method, and more specifically to an apparatus and method for forming a blower wheel having blades that are non-parallel with an axis of the blower wheel.

BACKGROUND OF THE INVENTION

Blower wheels are often utilized in cross-flow fans, also called transverse fans or centrifugal fans. One type of blower wheel comprises a plurality of fan blades that are positioned about a circumference of the blower wheel, wherein the plurality of fan blades are further axially inclined, therein mitigating to a certain degree, noise associated with the rotation of the blower wheel within a housing.

Conventionally, blower wheels having inclined blades are formed by aligning blades with respect to two or more disks, wherein the blades are initially set in grooves in the disks such that the inclined blades are skewed at a predetermined angle from one end of the blower wheel to another (e.g., not parallel with an axis of the blower wheel defined by the two or more disks). The blades are subsequently fastened to the two or more disks by a pressing or weld the blades to the two or more disks, therein fixing the blades in the inclined position at the predetermined angle. Such a fastening of the blades to the two or more disks, however, can cause a variation in the predetermined angle from one blower wheel to another.

SUMMARY OF THE INVENTION

The present disclosure overcomes the limitations of the prior art by providing an improved system, apparatus, and method forming a blower wheel having axially inclined blades. Accordingly, the following presents a simplified summary in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

In accordance with one exemplary aspect, an apparatus for forming a blower wheel is provided, wherein the blower wheel initially comprises a first end cap, a second end cap, and a plurality of blades arranged about a circumference of the first and second end caps. The plurality of blades extend longitudinally between the first and second end caps. In accordance with the disclosure, the apparatus comprises a first engagement member rotatably coupled to a first end motor, wherein the first engagement member is configured to mate with the first end cap. A second engagement member is further rotatably coupled to a second end motor, wherein the second engagement member configured to mate with the second end cap. The first and second end motors, in one example, comprise servo motors.

A crimping roller assembly is further rotatably coupled to a crimping roller motor, wherein the crimping roller assembly is configured to selectively crimp the first and second end caps to the plurality of blades. The first and second end caps, for example, each comprise a radially slotted back plate, wherein the plurality of blades initially rest in a respective plurality of radial slots disposed about the circumference of the first and second end caps.

A controller is further provided, wherein the controller is configured to control a rotational speed of each of the first end motor, second end motor, and crimping roller motor. Based, at least in part, on a desired longitudinal pitch of the plurality of blades from the first end cap to the second end cap, the controller is configured to rotate the first engagement member a predetermined amount with respect to the second engagement member via the control of the first end motor and the second end motor. Once the predetermined amount of rotation is achieved, the controller is further configured to synchronize a circumferential speed of the first and second end caps and the crimping roller assembly via a control of the respective first and second end motors and crimping motor.

The crimping roller assembly, in one example, is further configured to radially translate with respect to a center of the first and second end caps, therein compressing the first and second end caps circumferentially and securing the plurality of blades to the first and second end caps. Accordingly, the crimping roller assembly, in concert with the first end motor, second end motor, and crimping roller, are configured to selectively set the desired longitudinal pitch of the plurality of blades from the first end cap to the second end cap via the controller.

Thus, to the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIGS. 1A-1C illustrate front and side views of an exemplary blower wheel in a preformed state prior to having a predetermined longitudinal pitch defined therein.

FIGS. 2A-2C illustrate front and side views of an exemplary blower wheel after having a predetermined longitudinal pitch defined therein.

FIG. 3 is a front plan view of an exemplary blower wheel forming apparatus according to one exemplary aspect of the invention.

DETAILED DESCRIPTION OF THE INVENTION

Figure 4:
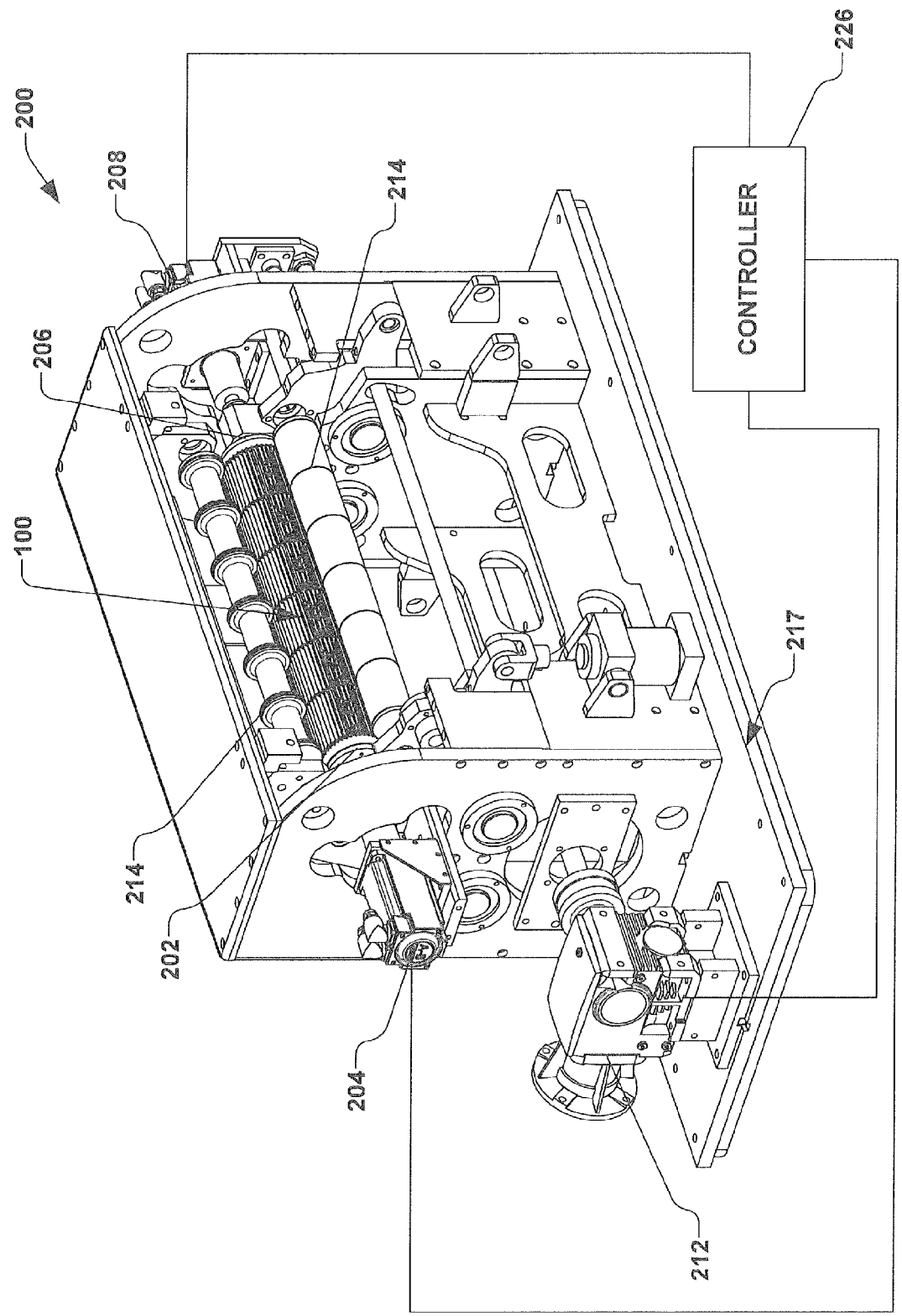
FIG. 4 is a perspective view of the exemplary blower wheel forming apparatus of FIG. 3 according to another exemplary aspect of the invention.

The present disclosure is directed generally toward a system and apparatus for forming a blower wheel having axially inclined blades. The disclosure is further directed to a method for forming a blower wheel having axially inclined blades. Accordingly, the present invention will now be described with reference to the drawings, wherein like reference numerals may be used to refer to like elements throughout. It should be understood that the description of these aspects are merely illustrative and that they should not be interpreted in a limiting sense. In the following description, for purposes of explanation, numerous specific details are set forth in order to provide a thorough understanding of the present invention. It will be evident to one skilled in the art, however, that the present invention may be practiced without these specific details.

Referring now to the figures, in order to gain a better understanding of the present invention, FIGS. 1A-1C illustrate an exemplary blower wheel 100 in a preformed state 102, wherein the blower wheel comprises a first end cap 104, a second end cap 106, and a plurality of blades 108 arranged about a circumference 110 of the first and second end caps and extending longitudinally therebetween. The first end cap 104 and second end cap 106, for example, each comprise a plurality of radial slots 112 disposed about a circumference 113 of the first and second end caps, wherein the plurality of blades 108 initially rest in the respective plurality of radial slots in the preformed state 102.

In one particular example, the blower wheel 100 further comprises one or more intermediate plates 114 disposed along a length of the blower wheel, wherein the one or more intermediate plates further provide additional support to the plurality of blades 108. The one or more intermediate plates 114, for example, are similar in structure to the first and second end caps 104 and 106. It should be noted that the number, structure, and location of the one or more intermediate plates 114 may vary, depending on design considerations, and the one or more intermediate plates may alternatively be eliminated altogether, if so desired.

Positioning, arrangement, and/or loose assembly of the first end cap 104, second end cap 106, plurality of blades 108, and/or the one or more intermediate plates 114 (e.g., defining the preformed state 102), for example, is performed in a jig or other device (not shown), wherein proper alignment and positioning of the blower wheel 100 is performed. The term "loose assembly" refers to the first end cap 104, second end cap 106, plurality of blades 108, and/or the one or more intermediate plates 114 being placed together such that the plurality of blades rest in the plurality of radial slots 112, but are not permanently fastened together, therein defining the preformed state 102 of the blower wheel 100.

In accordance with one example, as illustrated in FIGS. 1B and 1C, the first end cap 104 and second end cap 106 respectively comprise a first engagement pattern 116 and a second engagement pattern 118 defined therein. The first engagement pattern 116 and second engagement pattern 118, for example, are configured to provided to secure the blower wheel 100 to a rotational shaft of a blower motor (not shown), as will be understood by one of ordinary skill in the art. In accordance with another example, a first alignment feature 120 and a second alignment feature 122 are defined on the respective first end cap 104 and second end cap 106, wherein the first alignment feature and second alignment feature are configured to aid in aligning the first and second end caps and plurality of blades 108 into the preformed state 102. The first alignment feature 120 and second alignment feature 122, for example, comprise one or more of a hole, pattern, indentation, marking, sticker, and any other reflective, non-reflective, or transparent feature in or on the respective first end cap 104 and second end cap 106 operable to mechanically, optically (e.g., via an optical beam), and/or electronically aid in the alignment of the first and second end caps with respect to one another along a blower wheel axis 124 defined therebetween during and/or after the preparation of the blower wheel into its preformed state 102.

In FIGS. 2A-2C illustrate the blower wheel 100 in a final state 126, as will be further discussed infra, wherein the final state of the blower wheel is made possible by an exemplary blower wheel forming apparatus 200 illustrated in FIGS. 3 and 4. In accordance with the disclosure, the apparatus 200 of FIG. 3, for example, is particularly directed toward transforming the blower wheel 100 from the preformed state 102 of FIG. 1 to the final state 126 of FIG. 2, wherein the blower wheel, in its final state, has a fixed longitudinal pitch of the plurality of blades 108 from the first end cap 104 to the second end cap 106.

The apparatus 200 of FIGS. 3 and 4 for forming the blower wheel 100, for example, comprises a first engagement member 202 rotatably coupled to a first end motor 204, wherein the first engagement member is configured to mate with the first end cap 104 of FIGS. 1 and 2. The apparatus 200 of FIGS. 3 and 4, for example, further comprises a second engagement member 206 rotatably coupled to a second end motor 208, wherein the second engagement member is configured to mate with the second end cap 106. The first engagement member 202 and second engagement member 206, for example, are generally configured to mate with the respective first end cap 104 and second end cap 106 of the blower wheel 100, therein generally rotationally fixing the first end cap with respect to the first engagement member, and the second end cap with respect to the second engagement member. The first engagement member 202 and second engagement member 206, for example, are further configured to rotate about the blower wheel axis 124 associated with a blower wheel 100. The first end motor 204 and second end motor 208, for example, each comprise a servo motor configured to provide feedback associated with the rotational position of the first engagement member 202 and second engagement member 206.

A crimping roller assembly 210 is further rotatably coupled to a crimping roller motor 212, wherein the crimping roller assembly 210 is configured to selectively crimp the first end cap 104 and second end cap 106 to the plurality of blades 108. For example, each of the first end cap 104 and second end cap 106 comprise a plurality of tabs 213 associated with the respective plurality of radial slots 112, as illustrated in FIGS. 1B and 1C. The crimping roller assembly 210 of FIGS. 3 and 4, for example, comprises at least one crimping roller 214 configured to rotate about a crimping roller axis 216 that is selectively offset from the blower wheel axis 124, and wherein a circumference 218 of the crimping roller is configured to selectively contact and compress the circumference 113 of at least the first and second end caps 104 and 106 of FIGS. 1B and 1C. In one example, a plurality of crimping rollers 214 are operably coupled to the crimping roller motor 212, wherein the crimping motor is configured to selectively rotate each of the plurality of crimping rollers (e.g., illustrated as arrows 215 in FIGS. 5A and 5B) about a plurality of crimping roller axes 216. The crimping rollers 214 FIGS. 5A-5C, for example, are configured to compress the plurality of tabs 213 associated with the respective plurality of radial slots 112, as illustrated in FIGS. 1B and 1C, therein selectively securing the plurality of blades 108 to at least the first end cap 104 and second end cap 106 of FIGS. 1A-1C and 2A-2C, as will be further discussed infra.

In accordance with another example, wherein the blower wheel assembly 100 further comprises one or more intermediate plates 114 disposed between the first and second end caps 104 and 106 (e.g., as illustrated in FIGS. 1A and 2A), the at least one crimping roller 214 of FIGS. 3 and 4 is further configured to selectively contact and compress a circumference of the one or more intermediate plates, therein securing the plurality of blades 108 to the one or more intermediate plates.

Figure 5A:
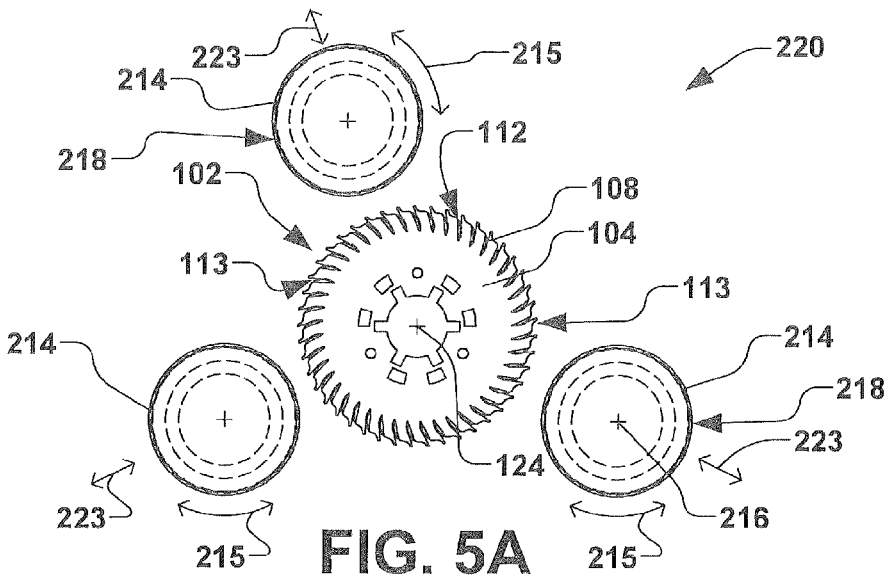
FIGS. 5A-5C illustrate an exemplary formation of a blower wheel according to another aspect of the invention.
Figure 5B:
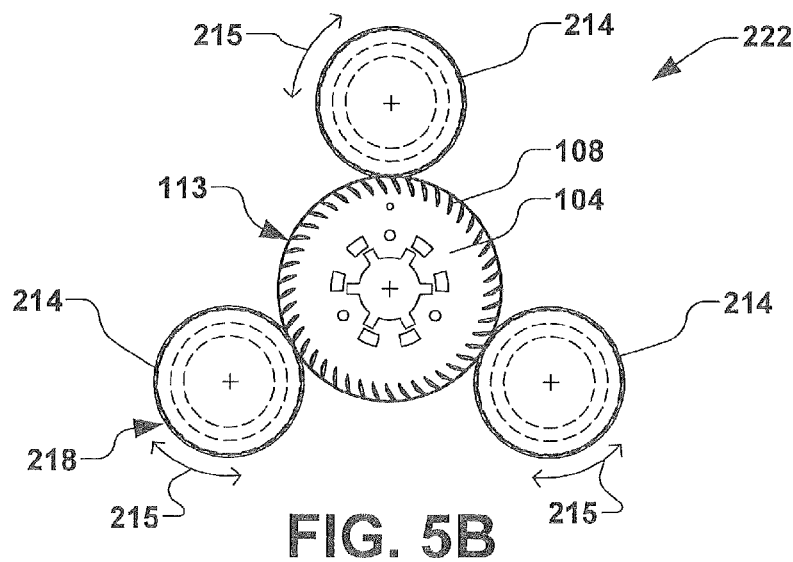
Figure 5C:
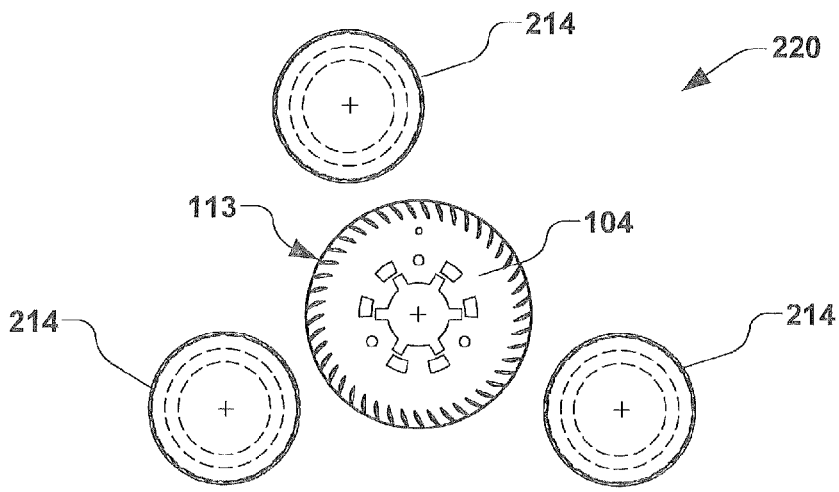

In one example, the apparatus 200 further comprises a base 217, wherein one or more of the crimping roller(s) 214, crimping roller motor 212, first end motor 204, and second end motor 208 are operably coupled to the base. According to another example, the crimping roller assembly 210 further comprises a radial positioning apparatus 218 configured to selectively position each of the crimping rollers 214 in a first position 220, such as illustrated in FIGS. 5A and 5C, and a second position 222, such as illustrated in FIG. 5B. As illustrated in FIGS. 5A and 5C, for example, when the plurality of crimping rollers 214 are in the first position 220, the circumference 218 of each of the plurality of crimping rollers does not contact the first and second end caps 104 and 106 (e.g., illustrated in FIGS. 3 and 4). When translated (e.g., illustrated as arrows 223) to the second position 222 illustrated in FIG. 5B, for example, the circumference 218 of the plurality of crimping rollers 214 are configured to contact and compress the circumference 113 of at least the first and second end caps 104 and 106 (e.g., illustrated in FIGS. 3 and 4) toward the blower wheel axis 124, therein compressing the plurality of tabs 213 associated with the respective plurality of radial slots 112 during a rotation of the crimping rollers about the crimping roller axes 216.

Thus, the compression of the plurality of tabs 213 associated with the translation of the crimping rollers 214 from the first position 220 of FIG. 5A to the second position 222 of FIG. 5B and rotation about the crimping roller axes 216 accordingly secures the plurality of blades 108 to at least the first end cap 104 and second end cap 106. Likewise, in the case of one or more intermediate plates 114 illustrated in FIGS. 1A and 2A being disposed between the first and second end caps 104 and 106, the crimping rollers 214 of FIGS. 5A-5C are further configured to selectively contact and compress a circumference of the one or more intermediate plates, therein similarly securing the plurality of blades 108 to the one or more intermediate plates.

In accordance with another example, the crimping roller assembly 210 of FIGS. 3 and 4 further comprises a plurality of gears 224, wherein the plurality of gears generally synchronize a rotational speed of the plurality of crimping rollers 214. As such, the plurality of gears 224 are further configured to translate the plurality of crimping rollers 214 between the first position 220 of FIGS. 5A and 5C and the second position 222 of FIG. 5B, while further providing the above-described rotation to the crimping rollers.

According to another exemplary aspect of the disclosure, a controller 226 is further provided in FIGS. 3 and 4, wherein the controller is configured to control a rotational speed of each of the first end motor 204, the second end motor 208, and the crimping roller motor 212. The control of the rotational speed of the first end motor 204, the second end motor 208, and the crimping roller motor 212, for example, is based, at least in part, on a desired longitudinal pitch of the plurality of blades 108 from the first end cap 104 to the second end cap 106.

In accordance with one aspect, the controller 226, for example, is configured to rotate the first engagement member 202 a predetermined amount with respect to the second engagement member 206 via the control of the first end motor 204 and the second end motor 208. For example, the controller 226 rotates the first engagement member 202 a predetermined amount via the first end motor 204 while maintaining the second engagement member 206 stationary by controlling the second end motor 208. Alternatively, the second end motor 208 can rotate the second engagement member 206 while holding the first engagement member 202 stationary via the control of the first end motor 204. In the case where the first end motor 204 and second end motor 208 each comprise servo motors, the servo motors are configured to provide rotational feedback to the controller 226.

Once the predetermined amount of rotation is achieved, the controller 226 is further configured to synchronize a circumferential speed of the first end cap 104, the second end cap 106, and the one or more crimping rollers 214 of the crimping roller assembly 210 via a control of the respective first end motor 204, second end motor 208, and crimping roller motor 212. Thus, apparatus 200 is configured to secure the plurality of blades 108 to the first end cap 104 and second end cap 106, and therefore fix the desired longitudinal pitch of the plurality of blades from the first end cap to the second end cap.

The controller 226, for example, is further configured to control the radial positioning apparatus 218. The control of the radial positioning apparatus 218, for example, can be based on the predetermined amount of rotation between the first end motor 204 and second end motor 208, wherein the positioning of the at least one crimping roller 214 in the second position 224 of FIG. 5B and securing of the plurality of blades 108 to the first end cap 104 and second end cap 106 occurs once the predetermined amount of rotation is achieved.

Figure 6:
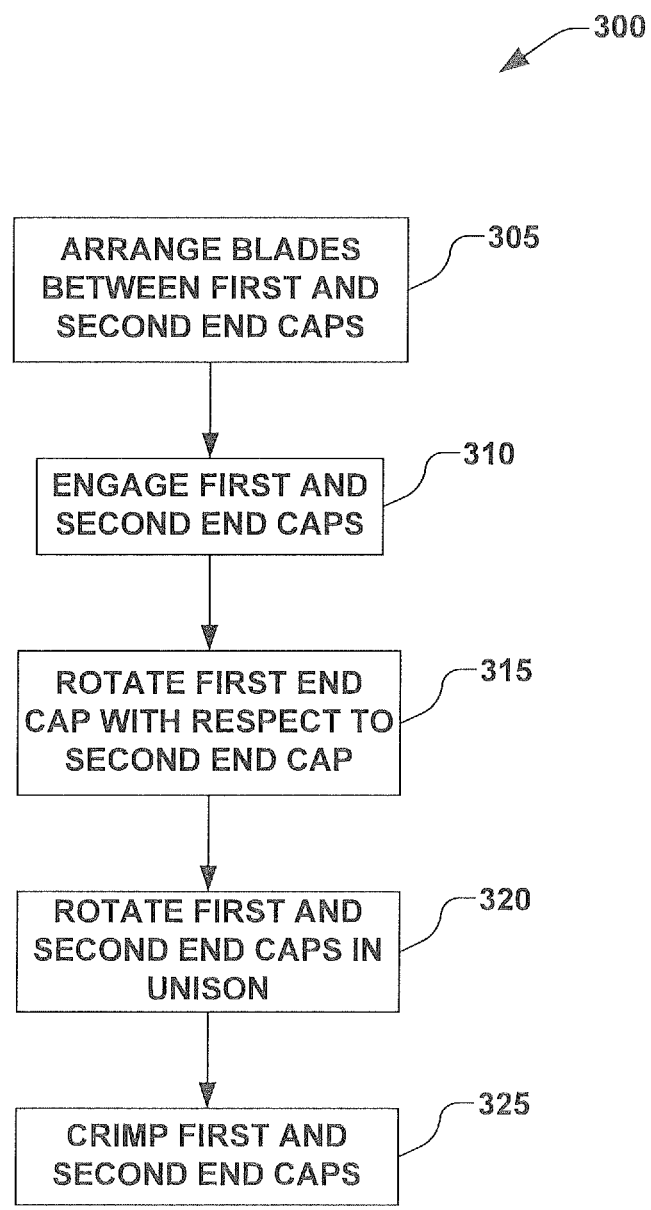
FIG. 6 is an exemplary methodology for forming a blower wheel having a predetermined longitudinal pitch.

The present disclosure further provides a method 300 in FIG. 6 for forming a blower wheel having axially-inclined (e.g., longitudinal pitched) blades, such as the exemplary blower wheel 100 illustrated in FIG. 2A. It should be noted that while exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with other systems not illustrated.

According to one example, as illustrated in FIG. 6, the method 300 comprises arranging a plurality of blades about a respective circumference of a first end cap and a second end cap in act 305, wherein the plurality of blades extend longitudinally between the first and second end caps and generally parallel to an axis defined by respective centers of the first end cap and second end cap. The plurality of blades, for example, are arranged about the circumference of the first end cap and second end cap in a jig. In one example, one or more intermediate plates are further arranged between the first and second end caps in act 305.

In one example, arranging the plurality of blades about respective circumferences of the first end cap and second end cap of act 305 further comprises aligning a first engagement pattern associated with the respective first end cap with respect to a second engagement pattern associated with the second cap. For example, the first engagement pattern 116 and second engagement pattern 118 of FIGS. 1A-1C are aligned via an aligning one or more of the first alignment feature 120 associated with the first end cap 104 with respect to a second alignment feature 122 associated with the second end cap 106. Various sensors (not shown), such as an optical sensor utilizing an optical beam can be directed toward the first end cap and second end cap, wherein once the first alignment feature and second alignment feature are aligned with the optical beam, a signal is produced indicating the alignment of the first engagement pattern with respect to a second engagement pattern.

In one example, in act 310 of FIG. 6, a first engagement member engages the first end cap, and a second engagement member engages the second end cap. The first engagement member is rotated a predetermined amount with respect to the second engagement member in act 315, such as via first and second servo motors 204 and 208 of FIGS. 3 and 4, therein skewing the plurality of blades at a desired longitudinal pitch from the first end cap to the second end cap. Once the desired longitudinal pitch as achieved in act 315 of FIG. 6, the first engagement member and second engagement member are rotated in unison in act 320. In act 325, the circumferences of the first end cap and second end cap are crimped while the first engagement member and second engagement member are rotated in unison, therein securing the plurality of blades to the first and second end caps and fixing the desired longitudinal pitch of the plurality of blades from the first end cap to the second end cap, and crimping a circumference of the one or more intermediate plates, therein securing the plurality of blades to the one or more intermediate plates. When one or more intermediate plates are provided in act 305, for example, the circumference of the one or more intermediate plates is also crimped in act 325.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. An apparatus for forming a blower wheel, the blower wheel having a first end cap, a second end cap, and a plurality of blades arranged about a circumference of the first and second end caps and extending longitudinally between the first and second end caps, the apparatus comprising:
    a first engagement member rotatably coupled to a first end motor, wherein the first engagement member is configured to mate with the first end cap;
    a second engagement member rotatably coupled to a second end motor, wherein the second engagement member is configured to mate with the second end cap;
    a crimping roller assembly rotatably coupled to a crimping roller motor and configured to selectively crimp the first and second end caps to the plurality of blades; and
    a controller configured to control a rotational speed of each of the first end motor, second end motor, and crimping roller motor, wherein, based on a desired longitudinal pitch of the plurality of blades from the first end cap to the second end cap, the controller is configured to rotate the first engagement member a predetermined amount with respect to the second engagement member via the control of the first end motor and the second end motor, and wherein once the predetermined amount of rotation is achieved, the controller is further configured to synchronize a circumferential speed of the first and second end caps and the crimping roller assembly via a control of the respective first and second end motors and crimping motor, therein securing the plurality of blades to the first and second end caps and fixing the desired longitudinal pitch of the plurality of blades from the first end cap to the second end cap.

2. The apparatus of claim 1, wherein the first end motor and second end motor each comprise a servo motor configured to provide rotational feedback to the controller.

3. The apparatus of claim 1, wherein the crimping roller assembly comprises a plurality of crimping rollers operably coupled to the crimping motor.

4. The apparatus of claim 3, wherein the crimping roller assembly further comprises a radial positioning apparatus configured to selectively position each of the plurality of crimping rollers in a first position and a second position, wherein in the first position, a circumference of each of the plurality of crimping rollers does not contact the first and second end caps, and wherein in the second position, the circumference of the crimping roller is configured to contact and compress the circumference of the first and second end caps toward the blower wheel axis.

5. The apparatus of claim 4, wherein the controller is further configured to control the radial positioning apparatus based on the predetermined amount of rotation, therein positioning the crimping roller in the second position and securing the plurality of blades to the first and second end caps once the predetermined amount of rotation is achieved.

6. The apparatus of claim 1, wherein the crimping roller assembly further comprises a plurality of gears, wherein the plurality of gears generally synchronize a rotational speed of the plurality of crimping rollers.

7. A blower wheel forming apparatus, comprising:
    a first engagement member configured to rotate about a blower wheel axis associated with a blower wheel assembly, the blower wheel assembly comprising a first end cap, a second end cap, and a plurality of blades arranged about a circumference of the first and second end caps and extending therebetween, wherein the blower wheel axis is generally defined by a center of the first end cap and second end cap, and wherein the first engagement member is further configured to mate with the first end cap of the blower wheel assembly, therein generally rotationally fixing the first end cap with respect to the first engagement member about the blower wheel axis;
    a second engagement member configured to mate with the second end cap of the blower wheel assembly, therein generally rotationally fixing the second end cap with respect to the second engagement member about the blower wheel axis;
    a crimping roller configured to rotate about a crimping roller axis that is selectively offset from the blower wheel axis, wherein a circumference of the crimping roller is configured to selectively contact and compress the circumference of the first and second end caps;
    a roller motor configured to rotate the crimping roller about the crimping roller axis;
    a first end motor operably coupled to the first engagement member and configured to individually rotate the first engagement member;
    a second end motor operably coupled to the second engagement member and configured to individually rotate the second engagement member; and
    a controller configured to individually control a rotational speed of each of the roller motor, first end motor, and second end motor, wherein, based on a desired longitudinal pitch of the plurality of blades from the first end cap to the second end cap, the controller is configured to rotate the first engagement member a predetermined amount with respect to the second engagement member via the control of the first end motor and the second end motor, and wherein once the predetermined amount of rotation is achieved, the controller is further configured to synchronize a circumferential speed of the first and second end caps and the crimping roller via a control of the respective first and second end motors and crimping motor, therein securing the plurality of blades to the first and second end caps and fixing the desired longitudinal pitch of the plurality of blades from the first end cap to the second end cap.

8. The blower wheel forming apparatus of claim 7, further comprising a radial positioning apparatus configured to selectively position the crimping roller in a first position and a second position, wherein in the first position, a circumference of the crimping roller does not contact the first and second end caps, and wherein in the second position, the circumference of the crimping roller is configured to contact and compress the circumference of the first and second end caps toward the blower wheel axis, and wherein the controller is further configured to control the radial positioning apparatus based on the predetermined amount of rotation, therein positioning the crimping roller in the second position and securing the plurality of blades to the first and second end caps once the predetermined amount of rotation is achieved.

9. The blower wheel forming apparatus of claim 8, comprising a plurality of crimping rollers disposed about the blower wheel axis, wherein the radial positioning apparatus is configured to selectively translate at least one of the plurality of crimping rollers between the first position and the second position with respect to the blower wheel axis.

10. The blower wheel forming apparatus of claim 9, wherein the radial positioning apparatus is configured to selectively translate two or more of the plurality of crimping rollers between respective first positions and second positions with respect to the blower wheel axis.

11. The blower wheel forming apparatus of claim 7, further comprising one or more gears operably coupling the crimping roller to the roller motor.

12. The blower wheel forming apparatus of claim 7, wherein one or more of the first end motor and second end motor comprise a servo motor.

13. The blower wheel forming apparatus of claim 7, wherein the blower wheel assembly further comprises one or more intermediate plates disposed between the first and second end caps, and wherein the crimping roller is further configured to selectively contact and compress a circumference of the one or more intermediate plates, therein securing the plurality of blades to the one or more intermediate plates.

14. The blower wheel forming apparatus of claim 7, further comprising a base, wherein one or more of the crimping roller, roller motor, first end motor, and second end motor are operably coupled to the base.

15. An apparatus for forming a blower wheel, the blower wheel having a first end cap, a second end cap, and a plurality of blades arranged about a circumference of the first and second end caps and extending therebetween, the apparatus comprising:
a first engagement member configured to mate with the first end cap;
a second engagement member configured to mate with the second end cap;
a crimping roller configured to rotate about a crimping roller axis, wherein a circumference of the crimping roller is configured to selectively contact and compress a circumference of the first and second end caps;
a roller motor configured to rotate the crimping roller about the crimping roller axis;
a first end motor operably coupled to the first engagement member;
a second end motor operably coupled to the second engagement member; and
a controller configured to control a rotational speed of each of the roller motor, first end motor, and second end motor, wherein, based on a desired longitudinal pitch of the plurality of blades from the first end cap to the second end cap, the controller is configured to rotate the first engagement member a predetermined amount with respect to the second engagement member via the control of the first end motor and the second end motor, and wherein once the predetermined amount of rotation is achieved, the controller is further configured to synchronize a circumferential speed of the first and second end caps and the crimping roller via a control of the respective first and second end motors and crimping motor, therein securing the plurality of blades to the first and second end caps and fixing the desired longitudinal pitch of the plurality of blades from the first end cap to the second end cap.

16. The apparatus of claim 15, further comprising a radial positioning apparatus configured to selectively position the crimping roller in a first position and a second position, wherein in the first position, a circumference of the crimping roller does not contact the first and second end caps, and wherein in the second position, the circumference of the crimping roller is configured to contact and compress the circumference of the first and second end caps toward the blower wheel axis, and wherein the controller is further configured to control the radial positioning apparatus based on the predetermined amount of rotation, therein positioning the crimping roller in the second position and securing the plurality of blades to the first and second end caps once the predetermined amount of rotation is achieved.

17. The apparatus of claim 16, comprising a plurality of crimping rollers disposed about the blower wheel axis, wherein the radial positioning apparatus is configured to selectively translate the plurality of crimping rollers between respective first positions and the second positions with respect to the blower wheel axis.

18. The blower wheel forming apparatus of claim 15, further comprising one or more gears operably coupling the crimping roller to the roller motor.

19. The blower wheel forming apparatus of claim 15, wherein one or more of the first end motor and second end motor comprise a servo motor.

20. The blower wheel forming apparatus of claim 15, wherein the blower wheel assembly further comprises one or more intermediate plates disposed between the first and second end caps, and wherein the crimping roller is further configured to selectively contact and compress a circumference of the one or more intermediate plates, therein securing the plurality of blades to the one or more intermediate plates.

* * * * *